United States Patent
Hozono

(10) Patent No.: US 8,155,562 B2
(45) Date of Patent: Apr. 10, 2012

(54) IMAGE READING DEVICE AND IMAGE FORMING DEVICE

(75) Inventor: Tomohide Hozono, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 546 days.

(21) Appl. No.: 12/399,321

(22) Filed: Mar. 6, 2009

(65) Prior Publication Data

US 2009/0232553 A1 Sep. 17, 2009

(30) Foreign Application Priority Data

Mar. 11, 2008 (JP) ................................. 2008-061021

(51) Int. Cl.
*G03G 15/04* (2006.01)
*H04N 1/04* (2006.01)
(52) U.S. Cl. .................... 399/221; 358/474; 358/497
(58) Field of Classification Search .................. 399/211; 358/474, 494, 497
See application file for complete search history.

(56) References Cited

U.S. PATENT DOCUMENTS

| 5,589,972 | A * | 12/1996 | Tellam et al. ............. 358/474 X |
| 6,339,214 | B1 * | 1/2002 | Takakura et al. ......... 358/474 X |
| 6,587,227 | B1 * | 7/2003 | Fullerton ...................... 358/474 |
| 7,742,203 | B2 * | 6/2010 | Sugiyama et al. ............ 358/497 |
| 2002/0159099 | A1 * | 10/2002 | Huang et al. .................. 358/494 |
| 2004/0125419 | A1 * | 7/2004 | Hsu et al. ...................... 358/497 |
| 2006/0077479 | A1 * | 4/2006 | Itou .............................. 358/474 |

FOREIGN PATENT DOCUMENTS

JP H07-203153 8/1995

* cited by examiner

*Primary Examiner* — Sophia S Chen
(74) *Attorney, Agent, or Firm* — Hoffman & Baron, LLP

(57) ABSTRACT

A copy machine is provided which includes: a fluorescent lamp; a mirror group having a plurality of mirrors that forms a light path by reflecting luminous flux from an original once on each of the plurality of mirrors, and is configured so that an imaging-side mirror, which is disposed most to an imaging side on the light path, has a shortest length in a main scanning direction; an imaging lens that forms an image from luminous flux reflected by the mirror group; a reading portion that reads an image on the original based on image formation by the imaging lens, disposed in an imaging position of the imaging lens; and a casing body that houses the fluorescent lamp, the mirror group, the imaging lens, and the reading portion, to be movable in a sub-scanning direction that is orthogonal to the main scanning direction.

10 Claims, 7 Drawing Sheets

IMAGE READING DEVICE AND IMAGE FORMING DEVICE

This application is based on and claims the benefit of priority from Japanese Patent Application No. 2008-061021, filed on 11 Mar. 2008, the content of which is incorporated herein by reference.

BACKGROUND OF THE INVENTION

1. Field of the Invention

The present invention relates to an image reading device and an image forming device including an image reading device.

2. Related Art

Conventionally, an image reading device for scanning an image on an original has been known, including a carriage for housing in an integrated manner: a light source for irradiating light on the original; an imaging lens for forming an image from luminous flux from the original; and a CCD (charge-coupled device), in which the carriage scans the image on the original while moving in a sub-scanning direction that is orthogonal to a main scanning direction.

Here, an optical path of a predetermined distance is required in the image reading device, for focusing the overall luminous flux from the original to such a degree that the luminous flux can enter the imaging lens.

On the other hand, an image reading device has been known that forms a light path of a predetermined distance by reflecting luminous flux on a plurality of mirrors.

For example, an image reading device is suggested in Japanese Unexamined Patent Application Publication No. Hei 07-203153, hereinafter referred to as Patent Document 1, which forms a light path by reflecting luminous flux from an original by three mirrors. More specifically, an image reading device is suggested that forms a light path of a predetermined distance by reflecting luminous flux from an original by a mirror disposed on a bottom face side of a carriage, and then reflecting the luminous flux by an opposing mirror disposed in a horizontal direction.

SUMMARY OF THE INVENTION

However, in the reading device disclosed in Patent Document 1, there was no ingenuity in a length of the three mirrors in a width direction (in a main scanning direction).

In addition, in the image reading device of Patent Document 1, there was a problem in that the plurality of mirrors occupies a large portion of an internal space of the carriage.

In other words, there was a problem in that the internal space of the carriage is not used efficiently.

Furthermore, since the plurality of mirrors is formed to have a width corresponding to the widest luminous flux, a material cost for a whole mirror group, including the plurality of mirrors, cannot be reduced.

Moreover, in a case where the plurality of mirrors are large in mass, that inertia force generated by locomotion of the carriage becomes greater, thereby increasing a load applied to a motor and the like that moves the carriage.

The present invention aims at providing an image reading device in which a light path is formed by reflecting luminous flux once on each of a plurality of mirrors, and predetermined mirrors are configured to be shorter in length in a main scanning direction in accordance with a length of the luminous flux in the main scanning direction.

In addition, the present invention aims at providing an image forming device including the image reading device.

The present invention relates to an image reading device including: a light source portion that irradiates light onto an original; a mirror group composed of a plurality of mirrors that forms a light path by reflecting luminous flux from the original once on each of the plurality of mirrors, and is configured so that an imaging-side mirror, which is disposed most to an imaging side on the light path, has a shortest length in a main scanning direction; an imaging lens that forms an image from luminous flux reflected by the mirror group; a reading portion that reads an image on the original based on image formation by the imaging lens, disposed in an imaging position of the imaging lens; and a casing body that houses the light source portion, the mirror group, the imaging lens, and the reading portion, to be movable in a sub-scanning direction that is orthogonal to the main scanning direction.

In addition, in the image reading device, the plurality of mirrors constituting the mirror group are preferably respectively made to be sequentially shorter in length in the main scanning direction as approaching a side of the imaging lens from a side of the original on the light path.

Furthermore, in the image reading device, the thickness of the imaging-side mirror is preferably formed so as to be greater than a thickness of an original-side mirror, included in the mirror group, which is disposed most to a side of the original on the light path.

Furthermore, in the image reading device, the plurality of mirrors constituting the mirror group are preferably made to be equal or become gradually greater in thickness as approaching a side of the imaging lens from a side of the original on the light path.

Moreover, in the image reading device, it is preferable to dispose in the casing body: a circuit substrate on which a control unit for controlling behavior of the reading portion is mounted, and a signal wire for electrically connecting the reading portion and the circuit substrate; to constitute the mirror group with the imaging-side mirror, the original-side mirror disposed most to a side of the original on the light path, and at least one intermediate mirror disposed between the original-side mirror and the imaging side mirror; and to dispose the circuit substrate alongside a predetermined intermediate mirror included in the at least one intermediate mirror in the main scanning direction.

In addition, in the image reading device, it is preferable for: the plurality of mirrors to be composed of: a first mirror that is the original-side mirror; a second mirror that is the intermediate mirror, a third mirror that is the intermediate mirror, and a fourth mirror that is the imaging-side mirror, which are sequentially disposed from the side of the original toward the side of the imaging lens, in a direction of the light path; the first mirror is disposed on a bottom face side of the casing body; the second mirror is disposed on a first side in the sub-scanning direction of the casing body; the third mirror is disposed on a second side in the sub-scanning direction of the casing body; the fourth mirror is disposed on the first side in the sub-scanning direction of the casing body, more to the bottom face side than the first mirror; and the circuit substrate is disposed alongside the third mirror in the main scanning direction.

The present invention relates to an image forming device including: an image reading device having a light source portion for irradiating light on an original, a mirror group including a plurality of mirrors that forms a light path by reflecting luminous flux from the original once on each of the plurality of mirrors, and is configured so that an imaging-side mirror, which is disposed most to an imaging side on the light path, has a shortest length in a main scanning direction, an imaging lens for forming an image from luminous flux reflected by the mirror group, a reading portion for reading an image on the original based on image formation by the imaging lens, disposed in an imaging position of the imaging lens, and a casing body for housing the light source portion, the mirror group, the imaging lens, and the reading portion, which can move in a sub-scanning direction that is orthogonal to the main scanning direction; an image supporting body on a surface of which an electrostatic latent image is formed based on image information relating to an image of the original that is read by the image reading device; a developing unit for developing a toner image on the electrostatic latent image formed on the image supporting body; and a transfer portion for directly or indirectly transferring the toner image formed on the image supporting body to a predetermined paper.

In addition, in the image forming device, the plurality of mirrors constituting the mirror group are preferably made to be sequentially shorter in length in the main scanning direction as approaching a side of the imaging lens from a side of the original on the light path.

Furthermore, in the image forming device, the thickness of the imaging-side mirror is preferably formed so as to be greater than a thickness of an original-side mirror, included in the mirror group, which is disposed most to a side of the original on the light path.

Moreover, in the image forming device, the plurality of mirrors constituting the mirror group are preferably made equal or gradually greater in thickness as approaching a side of the imaging lens from a side of the original on the light path.

In addition, in the image forming device, it is preferable for: a circuit substrate to be disposed in the casing body on which a control unit for controlling behavior of the reading portion is mounted, and a signal wire for electrically connecting the reading portion and the circuit substrate; the mirror group to comprise the imaging-side mirror, the original-side mirror disposed most to a side of the original on the light path, and at least one intermediate mirror disposed between the original-side mirror and the imaging side mirror; and the circuit substrate to be disposed alongside a predetermined intermediate mirror included among the at least one intermediate mirror in the main scanning direction.

Furthermore, in the image forming device, it is preferable for: the plurality of mirrors to be composed of: a first mirror that is the original-side mirror; a second mirror that is the intermediate mirror, a third mirror that is the intermediate mirror, and a fourth mirror that is the imaging-side mirror, which are sequentially disposed from the side of the original toward the side of the imaging lens, in a direction of the light path; the first mirror to be disposed on a bottom face side of the casing body; the second mirror to be disposed on a first side in the sub-scanning direction of the casing body; the third mirror to be disposed on a second side in the sub-scanning direction of the casing body; the fourth mirror to be disposed on the first side in the sub-scanning direction of the casing body, more to the bottom face side than the first mirror; and the circuit substrate to be disposed alongside the third mirror in the main scanning direction.

According to the present invention, an image reading device can be provided in which a light path is formed by reflecting luminous flux once on each of a plurality of mirrors, and predetermined mirrors are configured to be shorter in length in a main scanning direction in accordance with a length of the luminous flux in the main scanning direction.

In addition, according to the present invention, an image forming device including the image reading device can be provided.

DETAILED DESCRIPTION OF THE INVENTION

A preferred embodiment of the present invention is described hereinafter with reference to the drawings.

Figure 1:
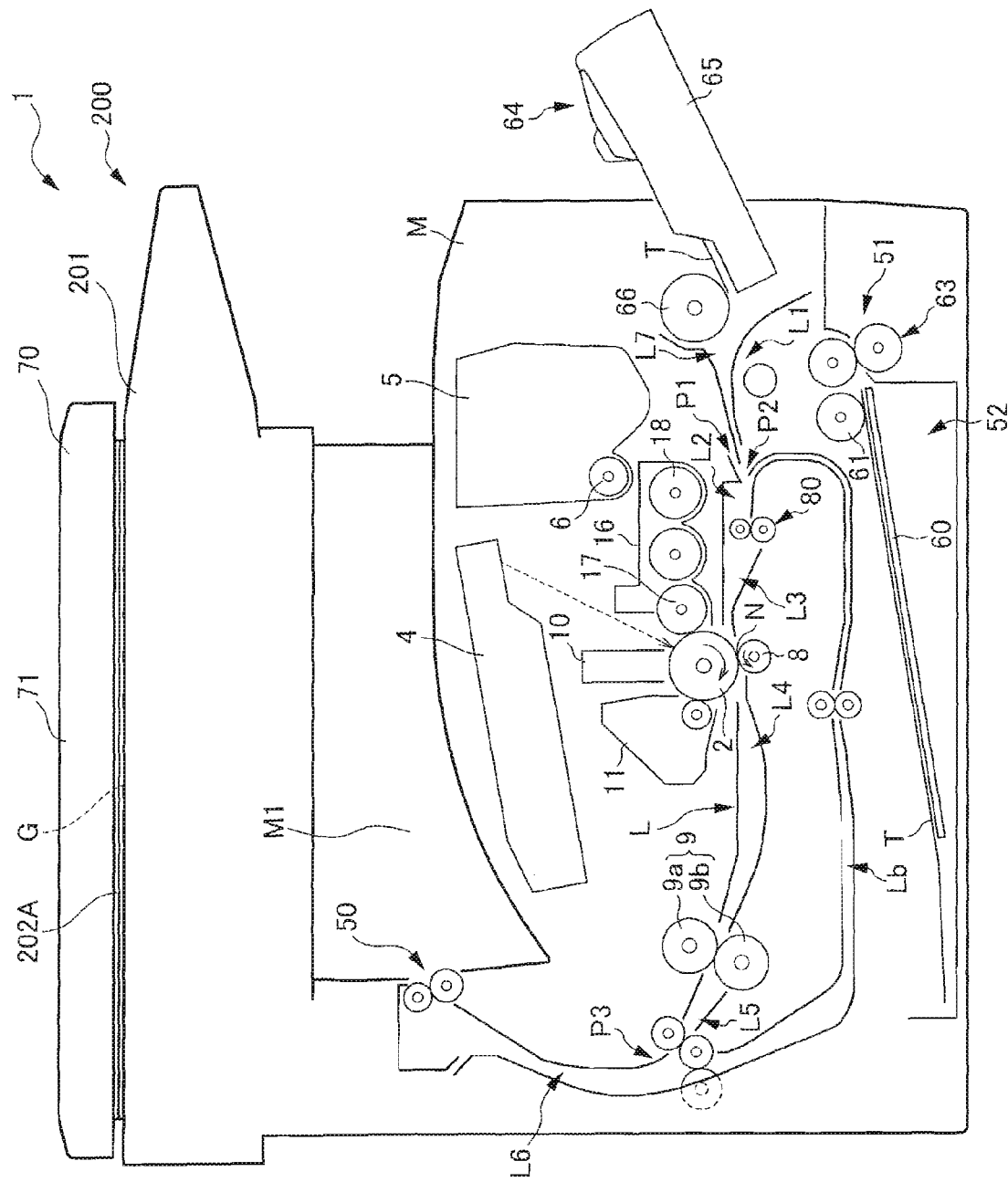
FIG. 1 is a left lateral view showing an arrangement of components of the copy machine 1.

An overall structure of a copy machine 1 as an image forming device according to the present embodiment is described referring to FIG. 1. FIG. 1 is a left lateral view showing disposition of components of the copy machine 1. In the present embodiment, a side on which a manual feeding tray 65 (described later) is disposed (a right side in FIG. 1) is a front side of the copy machine 1.

The copy machine 1 as the image forming device includes: an image reading device 200 disposed on an upper side thereof; and a device main body M disposed on a lower side thereof that forms a toner image on a paper T on the basis of image information from the image reading device 200.

The image reading device 200 includes an original feeder portion 70 for feeding a predetermined original G, and a reader portion 201 for reading an image on the original G. The original feeder portion 70 is connected with the reader portion 201 by means of a connecting portion (not shown, so as to be openable and closeable. The original feeder portion 70 also protects a reading surface 202A (described later).

In a case where the original feeder portion 70 is in a closed state, the original G is placed on an original support portion 71 provided on an upper face of the original feeder portion 70. The original G placed on the original support portion 71 is fed by a feeding roller (not shown) to a first reading surface 203A (see FIG. 2) constituting the reading surface 202A (see FIG. 2) in the reader portion 201. In this case, a carriage 210 (see FIG. 2) as the casing body is fixed to a first position 203 (see FIG. 2). Then, the original G is slid through the first reading surface 203A and a CCD 235 (see FIG. 6), as an image reader portion disposed in the carriage 210 reads an image on a surface of the original G.

In a case where the original feeder portion 70 is in an open state, the original G is placed on a second reading surface 204A (see FIG. 2) constituting the reading surface 202A. In this case, the carriage 210 is disposed in a second position 204 (see FIG. 2) and moved at a constant speed in a sub-scanning direction X that is orthogonal to a main scanning direction Y in the second position 204. The image reading device 200 thus reads an image on the original G placed on the second reading surface 904A.

The reader portion 201 of the image reading device 20U is described later in detail.

The device main body M includes: an image forming portion for forming a predetermined image on the paper T on the basis of predetermined image information; and a paper feeding/ejection portion for feeding the paper T to the image forming portion and ejecting the paper T on which an image is formed.

As shown in FIG. 1, the image forming portion includes a photoreceptor drum 2, a charging portion 10, a laser scanner unit 4, a developing unit 16, a toner cartridge 5, a toner feeding device 6, a transfer roller 8, and a fixing device 9.

The paper feeding/ejection portion includes a paper feeding cassette 52, a manual, feeding tray 65, a resist roller pair 80, and a paper path L for the paper T.

The photoreceptor drum 2 is a cylindrically shaped member. The photoreceptor drum 2 functions as an image supporting body. The photoreceptor drum 2 is disposed in the device main body M in a rotatable manner on an axis that is vertical with respect to a paper surface of FIG. 1. An electrostatic latent image is formed on a surface of the photoreceptor drum 2.

The charging portion 10 is disposed vertically above the photoreceptor drum 2. The charging portion 10 positively charges (positive polarity) the surface of the photoreceptor drum 2 uniformly.

The laser scanner unit 4 is disposed vertically above the photoreceptor drum 2, spaced apart therefrom. The laser scanner unit 4 is configured including a laser light source, a polygon mirror, a polygon mirror driving motor and the like, which are not shown.

The laser scanner Unit 4 scans and exposes the surface of the photoreceptor drum 2 based on image information output by the image reading device 200. By being scanned and exposed by the laser scanner unit 4, an electric charge charged onto the surface of the photoreceptor drum 2 is removed. In this way, an electrostatic latent image is formed on a surface of the photoreceptor drum 2.

The developing unit 16 is disposed in front of the photoreceptor drum 2 (on the right side of FIG. 1). The developing unit 16 develops a single color (usually black) toner image on the electrostatic latent image formed on the photoreceptor drum 2. The developing unit 16 is configured including a developing roller 17 that can be disposed facing the photoreceptor drum 2, and a stirring roller 18 for stirring a toner.

The toner cartridge stores a toner that is supplied to the developing unit 16.

The toner feeding device 6 supplies the toner stored in the toner cartridge 5 to the developing unit 16.

A drum cleaning device 11 is disposed behind the photoreceptor drum 2 (on the left side of FIG. 1). A drum cleaning device 11 removes toner and attached matters on the surface of the photoreceptor drum 2.

The transfer roller 8 transfers the toner image developed on the surface of the photoreceptor drum 2 to the paper T. A transfer bias for transferring the toner image developed on the photoreceptor drum 2 to the paper T is applied to the transfer roller 8, by a voltage application portion (not shown).

The transfer roller 8 can be either in contact with or spaced apart from the photoreceptor drum 2. More specifically, the transfer roller 8 is configured to be movable between a contacting position that is in contact with the photoreceptor drum 2 and a spaced position that is spaced apart from the photoreceptor drum 2. In particular, the transfer roller 8 is moved to the contacting position for transferring the toner image developed on the photoreceptor drum 2 to the paper T, and to the spaced position in all other circumstances.

The paper T is sandwiched between the photoreceptor drum 2 and the transfer roller 8, and pressed against the surface of the photoreceptor drum 2 (surface on which the toner image is developed). A transfer nip, as the transfer portion, is thus formed and the toner image developed on the photoreceptor drum 2 is transferred to the paper T.

The fixing device 9 fuses and fixes toner constituting the toner image transferred to the paper T. The fixing device 9 includes a heating roller 9a that is heated by a heater, and a pressurizing roller 9b that is in pressurized contact with the heating roller 9a. The heating roller 9a and the pressurizing roller 9b sandwiches and conveys the paper T to which the toner image is transferred. The paper T is conveyed in a state of being sandwiched between the heating roller 9a and the pressurizing roller 9b, thereby fusing and fixing the toner transferred thereto.

The paper feeding cassette 52 is disposed in a lower portion (lower side in a vertical direction) in the device main body M. The paper feeding cassette 52 is slidably disposed horizontally toward a front side (the right side in FIG. 1) of the device main body M. The paper feeding cassette 52 includes a placing board 60 on which the paper T is placed. The paper feeding cassette 52 stores the paper T being stacked on the placing board 6u.

A cassette feeding portion 51 is disposed in an end portion of the paper feeding cassette 52 on a side of discharging the paper (in a right end portion of FIG. 1). The cassette feeding portion 51 dispatches the paper T stored in the paper feeding cassette 52 to a paper path L. The cassette feeding portion 51 includes a double feed preventing mechanism composed of: a forward feed roller 61 for picking up the paper T placed on the placing board 60; and a roller pair 63 for feeding the paper T one sheet at a time to the paper path L.

The paper path L for conveying the paper T is formed between the cassette feeding portion 51 or a manual feeding portion 64 and an election portion 50. The paper path L includes: a first paper path L1 from the cassette feeding portion 51 to a first junction P1; a second paper path L2 from the first junction P1 to the resist roller pair 80; a third paper path L3 from the resist roller pair 80 to the transfer roller 8; a fourth paper path L4 from the transfer roller 8 to the fixing device 9; a fifth paper path L5 from the fixing device 9 to a branch portion P3; and a sixth paper path L6 from the branch portion P3 to the ejection portion 50.

The paper path L further includes a seventh paper path L7 from the manual feeding tray 65 to the first Junction P1. The first junction P1 is a junction between the first paper path L1 for conveying the paper T from the cassette feeding portion 51 and the seventh paper path L7 for conveying the paper T from the manual feeding tray 65.

The second junction P2 is provided in the middle of the second paper path L2. In addition, the paper path L has a reverse paper path Lb from the branch portion P3 to the second junction P2. The second junction P2 is a junction between the second paper path L2 and the reverse paper path Lb.

Here, the resist roller pair 80 is disposed on an upstream side, in a conveying direction of the paper T, of the transfer roller 8 (the right side in FIG. 1). The resist roller pair 80 is a pair of rollers for skew compensation of the paper T and timing adjustment with respect to the toner image.

For a case of performing duplex printing of the paper T, a reverse paper path Lb is provided, which is a paper path for making an opposite surface (an unprinted surface), to a surface that has already been printed, face toward the photoreceptor drum 2.

The reverse paper path Lb can reverse and return the paper T, conveyed from the branch portion P3 toward the ejecting portion 50, to the second paper path L2. A predetermined toner image is transferred by, the photoreceptor drum 2 to a non-print side of the paper T that is reversed by the reverse paper path Lb.

The manual feeding portion 64 is provided on a front face side (the right side in FIG. 1) of the device main body M, above the feeding cassette 52. The manual feeding portion 64 includes the manual feeding tray 65 and a feeding roller 66. A base end portion of the manual feeding tray 65 is connected in the vicinity of a gateway to the seventh paper path L7, so as to be rotatable (openable and closeable). The manual feeding tray 65 is connected by a base end portion thereof so as to be rotatable (openable and closeable), in the vicinity of a gateway to the seventh paper path L7. The feeding roller 66 picks up the paper T placed on the manual feeding tray 65 and feeds the paper T toward the seventh paper path L7.

The manual feeding portion 64 feeds the paper T placed on the manual feeding tray 65 in an open state to the second paper path L2 via the seventh paper path L7 and the first junction P1.

The ejecting portion 50 is formed in an end portion of the sixth paper path L6. The ejecting portion 50 is disposed vertically above the device main body M. The ejecting portion 50 has an opening toward a front of the device main body M (right side in FIG. 1). The ejecting portion 50 ejects the paper T, on which the toner is fixed by the fixing device 9, to the outside of the device main body M.

An ejected paper accumulating portion M1 is formed in the vicinity of the opening of the ejecting portion 50. The ejected paper accumulating portion M1 is formed on an upper face (outer face) of the device main body M. The ejected paper accumulating portion M1 is a portion of the upper face of the device main body M formed to be depressed vertically downward. A bottom face of the ejected paper accumulating portion M1 constitutes a part of the upper face of the device main body M. The paper T, to which a predetermined image is transferred, ejected from the ejection portion 50 is stacked and accumulated in the ejected paper accumulating portion M1.

The reader portion 201 of the image reading device 200 is described hereinafter with reference to FIGS. 2 to 7.

Figure 2:
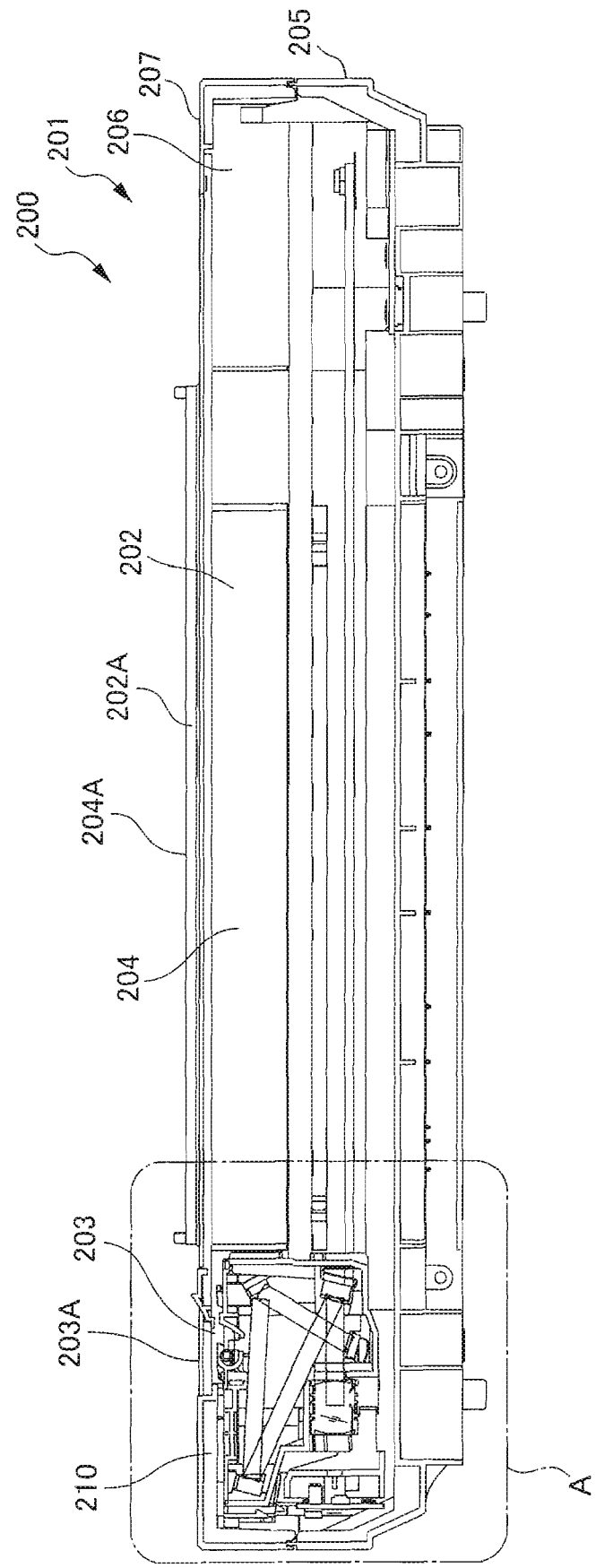
FIG. 2 is a sectional view of the reader portion 201.
Figure 3:
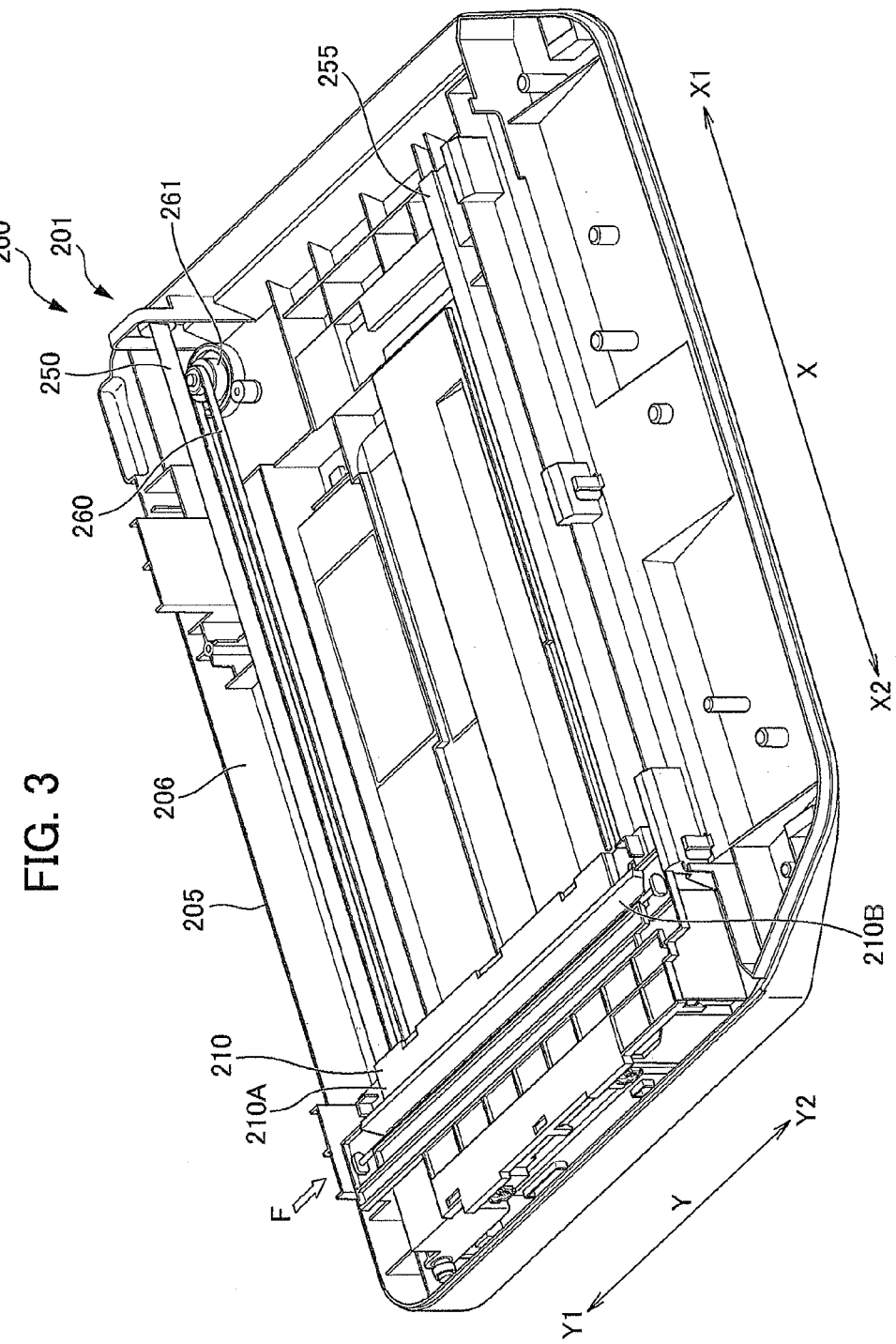
FIG. 3 is an exploded perspective view illustrating an overall structure of the reader portion 201.
Figure 4:
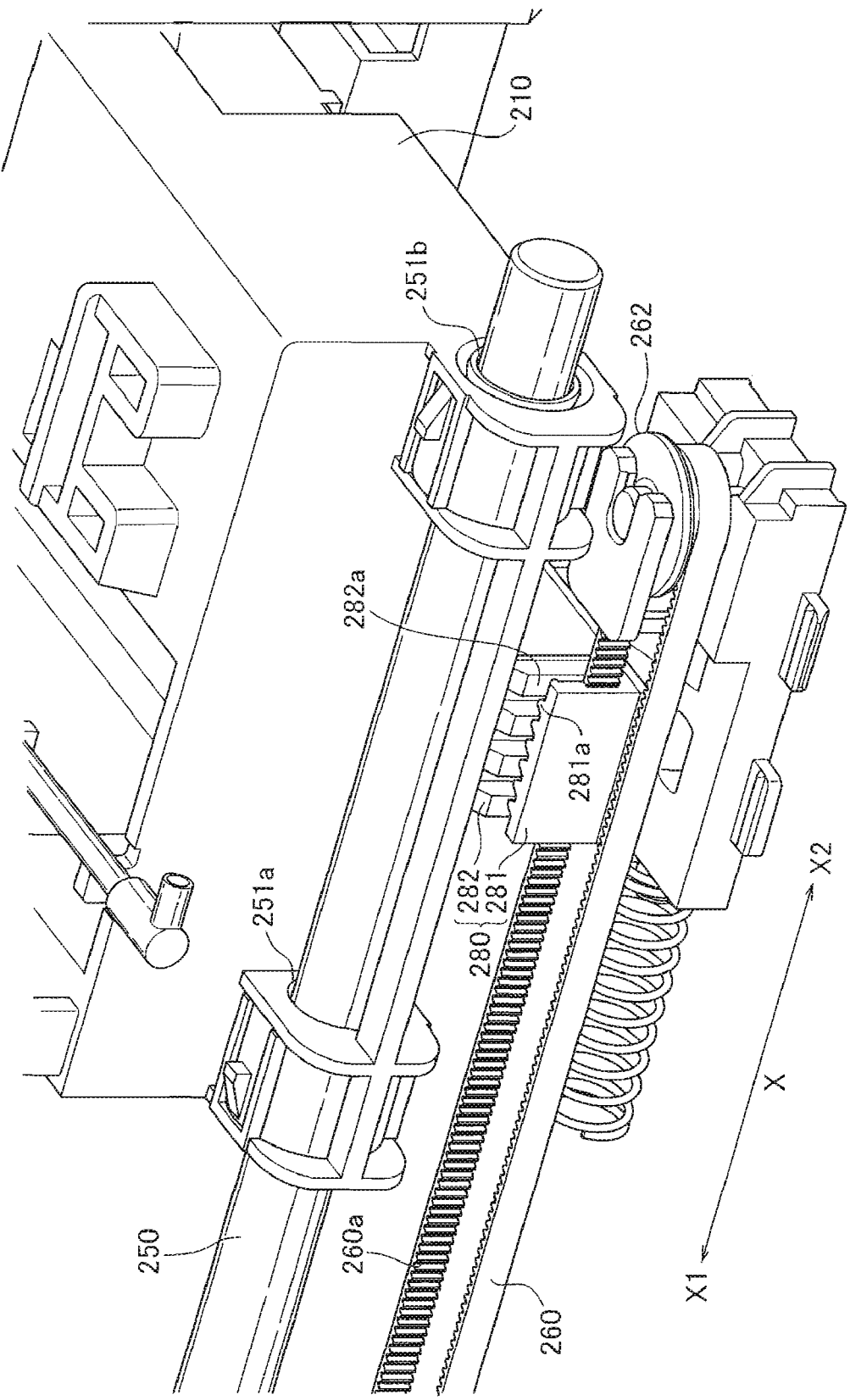
FIG. 4 is a diagram showing the carriage 210 seen from a direction of an arrow F in FIG. 3.
Figure 5:
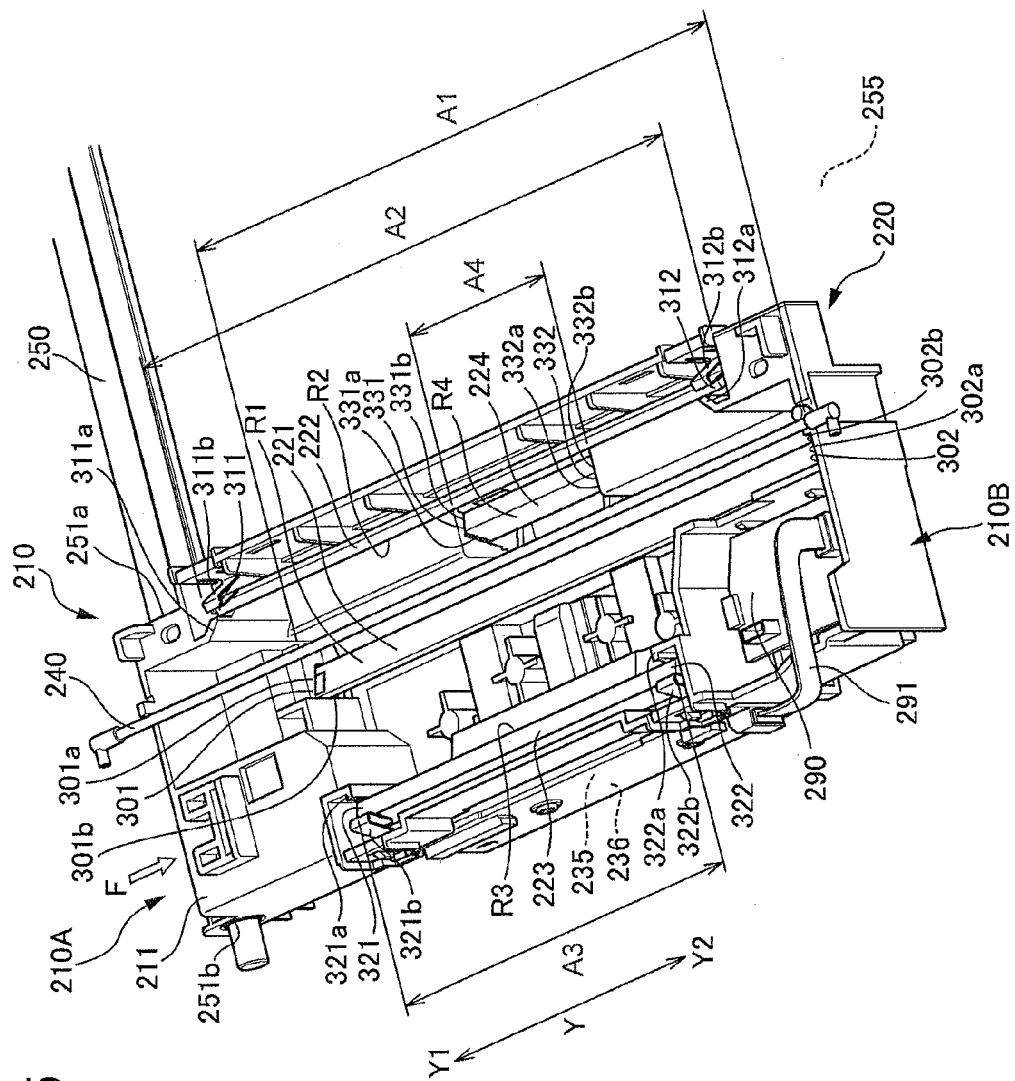
FIG. 5 is a diagram illustrating a structure of the carriage 210.
Figure 6:
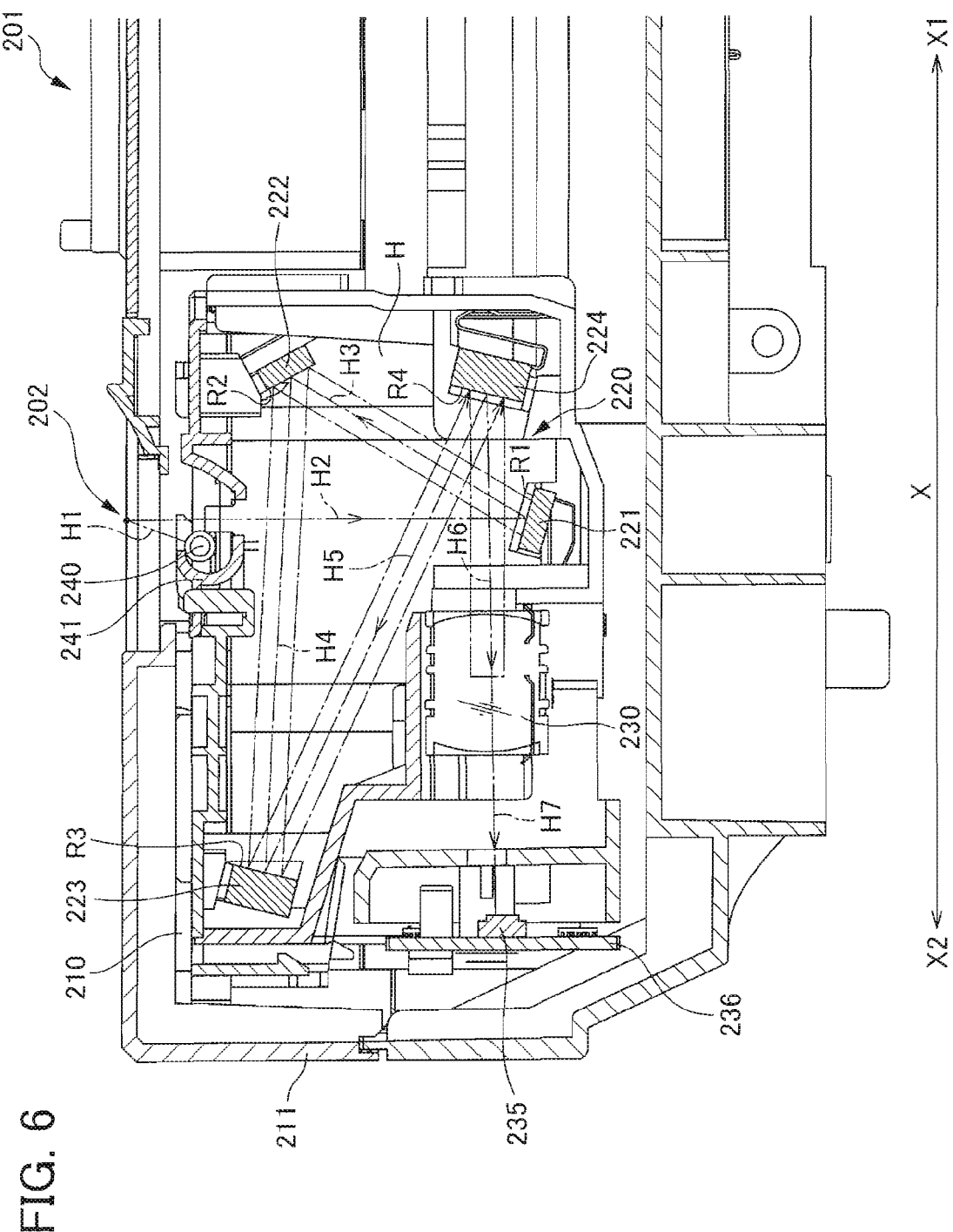
FIG. 6 is an enlarged view of a region A in FIG. 2.
Figure 7:
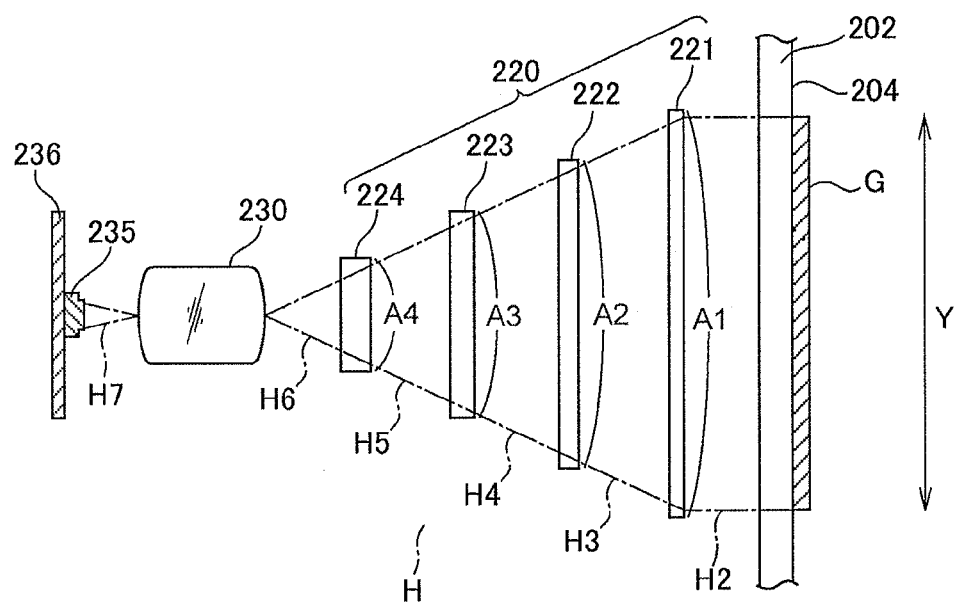
FIG. 7 is a diagram showing a state where mirrors 221, 222, 223, and 224 are deployed so as to make a light path H straight.

FIG. 2 is a sectional view of the reader portion 201. FIG. 3 is an exploded perspective view describing an overall structure of the reader portion 201. FIG. 4 is a diagram showing the carriage 210 seen from a direction of an arrow F in FIG. 3. FIG. 5 is a diagram describing a structure of the carriage 210. FIG. 6 is an enlarged view of a region A in FIG. 2. FIG. 7 is a diagram showing a state where mirrors 221, 222, 223, and 224 are deployed so as to make a light path H straight.

As shown in FIG. 2, the reader portion 201 includes: a housing case 205 constituting an outer shape of the reader portion 201 and having an opening 206 on a vertically upper face thereof; and an upper case 207 that is disposed so as to cover the opening 206 and configured including the reading surface 202A that is light transmissive.

As shown in FIG. 2, the reader portion 201 includes the reading surface 202A, which is formed on a vertically upper face thereof. The reading surface 202A includes the first reading surface 203A and the second reading surface 204A. The first reading surface 203A is, as described above, a reading surface for reading an image on the original G that is slid and conveyed in a case where the original feeder portion 70 (see FIG. 1) is in a closed state. The second reading surface 204A is, as described above, a reading surface on which the original G is placed and an image thereof is read, in a case where the original feeder portion 70 (see FIG. 1) is in an open state.

As shown in FIG. 3, in the housing case 205 housed or formed are: the carriage 210 that is configured to be movable in a sub-scanning direction X; a rod-like guiding portion 250 for guiding the movement of the carriage 210, which is inserted into insertion openings 251a and 251b (see FIG. 4) that are formed on a side to a first end 210A of the carriage 210; a circular belt 260 that is connected with the carriage 210; a motor portion 261 that is disposed inside the circular belt 260 and rotationally moves the circular belt 260; and a slide portion 255 that is formed on a vertically lower side on a side to a second end 210B of the carriage 210 and slidably supports the second end 210B.

As shown in FIG. 3, the guiding portion 250 is a rod-like member having an elongated cylindrical shape. The guiding portion 250 is disposed inside the housing case 205 so as to extend in the sub-scanning direction X from an end portion on a side to X2 to an end portion on a side to X1. The guiding portion 250 is inserted into the insertion openings 251a and 251b that are formed on a side to the first end 210A of the carriage 210. The guiding portion 250 guides the movement of the carriage 210 in the sub-scanning direction X.

As shown in FIG. 3, the slide portion 255 is a planar portion formed on a vertically lower side on a side to the second end 210B of the carriage 210. The slide portion 255 is a planar portion processed so as to lower a frictional resistance. The slide portion 255 is formed on a side to an opposite end in the main scanning direction Y to a side on which the guiding portion 250 is formed. The slide portion 255 is disposed inside the housing case 205 so as to extend in the sub-scanning direction X from an end portion on a side to X2 to an end portion on a side to X1. The slide portion 255 slidably supports the second end 210B of the carriage 210. In other words, the second end 210B of the carriage 210 is slid in the sub-scanning direction X in a state of being placed on the slide portion 255.

As shown in FIG. 3, the circular belt 260 is partially connected with the carriage 210. The circular belt 260 is a circular belt member. More specifically, the circular belt 260 is a belt member formed to be endless with an elastic material. The circular belt 260 is stretched around a roller 262 (see FIG. 4) and the motor portion 261 with a predetermined tension. The roller 262 is disposed on a side to X2 and the motor portion 261 is disposed on a side to X1 in the sub-scanning direction. The circular belt 260, stretched around an axis member and the motor portion 261 in a predetermined tension, rotationally moves in accordance with rotation of the motor portion 261. As the circular belt 260 rotationally moves, the carriage 210 connected with the circular belt 260 is carried in the sub-scanning direction X being guided by the guiding portion 250.

As shown in FIG. 3, the motor portion 261 is disposed on a vertically lower side in the guide portion 250 and on a side to X1 in the sub-scanning direction X in the housing case 205. As described above, the motor portion 261 is disposed inside the circular belt 260. The motor portion 261 rotates to rotate the circular belt 260, stretched around in a predetermined tension. In other words, the motor portion 261 rotates to move the carriage 210 connected with the circular belt 260.

As shown in FIG. 4, a connecting portion 280 projecting from the carriage 210 includes an inner portion 281 disposed inside the circular belt 260 and an outer portion 282 disposed outside the circular belt 260. A plurality of teeth 281a facing an inner face of the circular belt 260 is formed on the inner portion 281. The inner portion 281 is disposed so that each of the plurality of teeth 281a engages with a plurality of notch portions 260a formed on the inner face of the circular belt 260. A plurality of contacting portions 282a facing an outer face of the circular belt 260 is formed on the outer portion 282. The outer portion 282 is disposed so that each of the plurality of contacting portions 282a contacts the outer face of the circular belt 260. The inner portion 281 and the outer portion 282 sandwich the circular belt 260, thus attaching the connecting portion 280 to the circular belt 260. In other words, the carriage 210 is attached to the circular belt 260 by means of the connecting portion 280.

As shown in FIGS. 5 and 6, the carriage 210 is a casing body having a substantially rectangular solid form elongated in the main scanning direction Y, including: a carriage case 211 constituting an outer shape thereof; a fluorescent lamp 240 as the light source disposed on a vertically upper side; a condensing mirror 241 for condensing light from the fluorescent lamp 240 toward a side of the original G; a mirror group 220 for forming the light path H by reflecting luminous flux being the light from the fluorescent lamp 240 reflected by the original G; an imaging lens 230 disposed in an end portion of the light path H for forming an image of the original G; the CCD 235 as the reader portion for reading the image of the original G thus formed; a CCD substrate 236 on which the CCD 235 is installed; a circuit substrate 290 on which a CPU (not shown) is installed as the control unit for controlling operation of the CCD 235; and a flexible print substrate 291 as the signal wire for electrically connecting the CCD substrate 236 (the CCD 235) and the circuit substrate 290.

As shown in FIG. 6, the fluorescent lamp 240 is disposed on a vertically upper side in the carriage 210, along the main scanning direction Y. The fluorescent lamp 240 emits light for irradiating the original G.

As shown in FIG. 6, the condensing mirror 241 is disposed so as to surround the fluorescent lamp 240 on a side to X2 in the sub-scanning direction X and a vertically lower side. The condensing mirror 241 condenses light from the fluorescent lamp 240 and irradiates the original G with a luminous flux H1.

The mirror group 220 includes the first mirror 221 as an original-side mirror, the second mirror 222 as an intermediate mirror, the third mirror 223 as a predetermined intermediate mirror, and the fourth mirror 224 as an imaging-side mirror. The mirror group 220 forms the light path H of a predetermined length by reflecting luminous flux H2 from the original G. The mirror group 220 forms the light path H of the predetermined length by reflecting back the luminous flux inside the carriage 210.

As shown in FIG. 6, the first mirror 221 is disposed on a bottom face side in the carriage case 211, so as to make a first reflective surface R1 facing vertically upward. The first mirror 221 reflects the luminous flux H2 from the original G to direct the luminous flux H2 toward the second mirror 222.

The second mirror 222 is disposed on a vertically upper side of the carriage case 211 and on a side to X1 in the sub-scanning direction X. The second mirror 222 is disposed so as to direct a second reflective surface R2 toward the first mirror 221 and the third mirror 223. The second mirror 222 reflects luminous flux H3 from the first mirror 221 to direct the luminous flux H3 toward the third mirror 223.

The third mirror 223 is disposed on a vertically upper side of the carriage case 211 and on a side to X2 in the sub-scanning direction X. The third mirror 223 is disposed so as to direct a third reflective surface R3 toward the second mirror 222 and the fourth mirror 224. The third mirror 223 reflects luminous flux H4 from the second mirror 222 to direct the luminous flux H4 toward the fourth mirror 224.

The fourth mirror 224 is disposed on a bottom face side of the carriage case 211 and on a side to X1 in the sub-scanning direction X. The fourth mirror 224 is disposed more to the bottom face side than the second mirror 222 that is also disposed on a side to X1 in the sub-scanning direction X. The fourth mirror 224 is disposed so as to direct a fourth reflective surface R4 toward the third mirror 223 and the imaging lens 230. The fourth mirror 224 reflects luminous flux H5 from the third mirror 223 to direct the luminous flux H5 toward the imaging lens 230. The fourth mirror 224 is disposed most to an imaging side (a side of the imaging lens 230) on the light path H.

As shown in FIG. 5, the mirrors 221, 222, 223, and 224 constituting the mirror group 220 are each fixed at both ends in the main scanning direction Y by fixing portions. More specifically the mirrors 221, 222, 223, and 224 constituting the mirror group 220 are each fixed by fixing portions so that the reflective surfaces R1, R2, R3 and R4 are maintained at predetermined angles.

More particularly, first, the first mirror 221 is fixed by a first fixing portion 301 and a second fixing portion 302, so that the first reflective surface R1 is maintained at a predetermined angle with respect to the second reflective surface R2 of the second mirror 222.

The first fixing portion 301 is disposed on a side to the guiding portion 250 (Y1 side) of the first mirror 221, in the main scanning direction Y. The first fixing portion 301 includes a first holding portion 301a disposed on a side to the first reflective surface R1, and a first pressing member 301b disposed on a side that is opposite to the first reflective surface R1. The first fixing portion 301 statically positions a first end of the first mirror 221 so that the first mirror 221 is at a predetermined angle with respect to the second mirror 222, by pressing the first end of the first mirror 221 toward a side of the first holding portion 301a by the first pressing member 301b.

The second fixing portion 302 is disposed on a side to the slide portion 255 (Y2 side) of the first mirror 221, in the main scanning direction Y. The second fixing portion 302 includes a second holding portion 302a disposed on a side to the first reflective surface R1, and a second pressing member 302b disposed on a side that is opposite to the first reflective surface R1. The second fixing portion 302 statically positions a second end of the first mirror 221 so that the first mirror 221 is at a predetermined angle with respect to the second mirror 222, by pressing the second end of the first mirror 221 toward a side of the second holding portion 302a by the second pressing member 302b.

Protruding portions (not shown) are formed in the first holding portion 301a and the second holding portion 302a. The protruding portion statically positions the first mirror 221 by contacting the first reflective surface R1 of the first mirror 221. Here, three protruding portions are preferably formed in the first holding portion 301a and the second holding portion 302a, to accurately maintain the angle of the first mirror 221 with respect to the second mirror 222. In other words, the first mirror 291 is preferably supported by three protruding members (three-point support) in the first holding portion 301a and the second holding portion 302a.

Similarly, the second mirror 222 is fixed by a third fixing portion 311 and a fourth fixing portion 312, so that the second reflective surface R2 is maintained at a predetermined angle with respect to the third reflective surface R3 of the third mirror 223. The second mirror 222 is fixed by the third fixing portion 311 formed on the second mirror 222 on a side to the guide portion 250 (Y1 side) in the main scanning direction Y and the fourth fixing portion 312 formed on a side to the slide portion 255 (Y2 side) in the main scanning direction Y. The third fixing portion 311 includes a third holding portion 311a disposed on a side to the second reflective surface R2, and a third pressing member 311b disposed on a side that is opposite to the second reflective surface R2 The fourth fixing portion 312 includes a fourth holding portion 312a disposed on a side to the second reflective surface R2, and a fourth pressing member 312b disposed on a side that is opposite to the second reflective surface R2. The third fixing portion 311 and the fourth fixing portion 312 statically position the second mirror 222 in the same manner as with the first fixing portion 301 and the second fixing portion 302 statically positioning the first mirror 221, as described above.

In addition, the third mirror 223 is fixed by a fifth fixing 321 and a sixth fixing portion 322, so that the third reflective surface R3 is maintained at a predetermined angle with respect to the fourth reflective surface R4 of the fourth mirror 224. The third mirror 223 is fixed by the fifth fixing portion 321 formed on the third mirror 223 on a side to the guide portion 250 (Y1 side) in the main scanning direction Y and the sixth fixing portion 322 formed on a side to the slide portion 255 (Y2 side) in the main scanning direction Y. The fifth fixing portion 321 includes a fifth holding portion 321a disposed on a side to the third reflective surface R3, and a fifth pressing member 321b disposed on a side that is opposite to the third reflective surface R3. The sixth fixing portion 321 includes a sixth holding portion 322a disposed on a side to the third reflective surface R3, and a sixth pressing member 322b disposed on a side that is opposite to the third reflective surface R3. The fifth fixing portion 321 and the sixth fixing portion 322 statically position the third mirror 223 in the same manner as with the first fixing portion 301 and the second fixing portion 302 statically positioning the first mirror 221, as described above.

In addition, the fourth mirror 224 is fixed by a seventh fixing portion 331 and an eighth fixing portion 332, so that the fourth reflective surface R4 is maintained at a predetermined angle with respect to the imaging lens 230. The fourth mirror 224 is fixed by the seventh fixing portion 331 formed on the fourth mirror 224 on a side to the guiding portion 250 (Y1 side) in the main scanning direction Y and the eighth fixing portion 332 formed on a side to the slide portion 255 (Y2 side) in the main scanning direction Y. The seventh fixing portion 331 includes a seventh holding portion 331a disposed on a side to the fourth reflective surface R4, and a seventh pressing member 331b disposed on a side that is opposite to the fourth reflective surface R4. The eighth fixing portion 332 includes an eight holding portion 332a disposed on a side to the fourth reflective surface R4, and an eighth pressing member 332b disposed on a side that is opposite to the fourth reflective surface R4. The seventh fixing portion 331 and the eighth fixing portion 332 statically position the fourth mirror 224 in the same manner as with the first fixing portion 301 and the second fixing portion 302 statically positioning the first mirror 221, as described above.

As shown in FIG. 7, the first mirror 221, the second mirror 222, the third mirror 223, and the fourth mirror 224 constituting the mirror group 220 are formed so that lengths in the main scanning direction Y (A1, A2, A3, and A4) are made sequentially shorter as approaching the imaging lens 230 on the light path H. In the present embodiment, the mirror group 220 is configured so that the fourth mirror 224 is the shortest in length in the main scanning direction Y among the mirrors constituting the mirror group 220.

Each of the first mirror 221, the second mirror 222, the third mirror 223, and the fourth mirror 224, constituting the mirror group 220, focuses luminous flux incident thereinto so as to make a length thereof in the main scanning direction Y (width) shorter. More specifically, each of the first mirror 221, the second mirror 222, the third mirror 223, and the fourth mirror 224 focuses luminous flux incident thereinto to such a degree that the image of the original G is not overly distorted. In order to focus luminous flux without overly distorting the image of the original G, a predetermined length is required for the light Path H.

As shown in FIG. 7, the first mirror 221, the second mirror 222, the third mirror 223, and the fourth mirror 224 constituting the mirror group 220 are each made to be slightly larger in width (length in the main scanning direction Y) than the luminous flux incident thereinto. More specifically, the first mirror 221 is made to be slightly larger in width than the luminous flux H2. In addition, the second mirror 221 is made to be slightly larger in width than the luminous flux H3. Furthermore, the third mirror 223 is made to be slightly larger in width than the luminous flux H4. Moreover, the fourth mirror 224 is made to be slightly larger in width than the luminous flux H5.

As described above, the second mirror 222, the third mirror 223 and the fourth mirror 224 are smaller in width (length in the main scanning direction Y) than the first mirror 221, thereby making a space in the width direction. This allows the circuit substrate 290 to be disposed alongside the third mirror 223 in the main scanning direction Y of the third mirror 223.

As shown in FIG. 7, the first mirror 221, the second mirror 222, the third mirror 223, and the fourth mirror 224 constituting the mirror group 220 are formed to be greater in thickness as approaching the imaging lens 230 on the light path H.

As shown in FIG. 6, the light path H includes the luminous flux H1 from the fluorescent lamp 240 to the original G, the luminous flux H2 from the original G to the first mirror 221, the luminous flux H3 from the first mirror 221 to the second mirror 222, the luminous flux H4 from the second mirror 222 to the third mirror 223, the luminous flux H5 from the third mirror 223 to the fourth mirror 224, the luminous flux H6 from the fourth mirror 224 to the imaging lens 230, and the luminous flux from the imaging lens 230 to the CCD 235. The luminous fluxes to H6 are formed by the mirror group 220. The luminous flux on the side to the imaging lens 230 on the light path H is launched into the imaging lens 230.

As shown in FIG. 6, the imaging lens 230 is disposed on a bottom face side of the carriage case 211 and substantially in a center in the sub-scanning direction X. The imaging lens 230 is disposed on a side to an end portion that is opposite to a side to the original G on the light path H. The imaging lens 230 is disposed between the luminous flux H6 and the luminous flux H7. The imaging lens 230 forms an image in a predetermined position from the luminous flux H6 launched thereinto. The imaging lens 230 forms an image of the original G in a predetermined position.

As shown in FIG. 6, the CCD 235 is disposed on a bottom face side of the carriage case 211 and on a side to X2 in the sub-scanning direction X. The CCD 235 is disposed in an imaging position of the imaging lens 230. The image of the original G thus formed is read by the CCD 235 as image data. The image data of the original G read by the CCD 235 is output to the device main body M via the CCD substrate 236.

As shown in FIG. 5, the circuit substrate 290 is disposed to be juxtaposed to the third mirror 223 as the intermediate mirror, on the Y2 side in the main scanning direction Y. The circuit substrate 290 can be disposed to be juxtaposed to the third mirror 223 in the main scanning direction Y, since the third mirror 223 is formed to be smaller in length in the main scanning direction Y than the first mirror that defines the length of the carriage 210 in the main scanning direction Y.

The circuit substrate 290 is electrically connected to the CCD substrate 236 via the flexible print substrate 291. In other words, the circuit substrate 290 is electrically connected to the CCD 235 via the flexible print substrate 291. A CPU (not shown) as the control unit for controlling reading operation of the CCD 235 is installed on the circuit substrate 290. The circuit substrate 290 outputs a signal from a predetermined electronic component to the CCD substrate 236, via the flexible print substrate 291.

As shown in FIG. 5, the flexible print substrate 291 is disposed in the carriage 210. More specifically, the flexible print substrate 291 is disposed in the carriage 210 since the CCD substrate 236 and the circuit substrate 290 are disposed in the carriage 210. The flexible print substrate 291 is shorter in length compared to a case where the circuit substrate 290 is disposed in a member other than the carriage 210.

Next, operations in the image reading device 200 are described hereinafter.

First, the original feeder portion 70 is made to be in an open state and the original G is placed on a second reading surface 204A (see FIG. 2) constituting the reading surface 202. The carriage 210 is brought to the second position 204 as a sensor (not shown) detects that the original G is placed on the second reading surface 204A.

Subsequently, the original feeder portion 70 is made to be in a closed state. When a start switch (not shown) is pressed, the copy machine 1 is instructed to copy an image on the original G. When a start switch (not shown) is pressed, the image reading device 200 starts an operation of reading the image on the original G.

More specifically, the fluorescent lamp 240 is turned on, as shown in FIG. 6. The original G is irradiated with light from the fluorescent lamp 240 thus turned on, being condensed by the condensing mirror 241. The carriage 210 is moved at a constant speed toward the X1 side in the sub-scanning direction X, while the original G is irradiated by the fluorescent lamp 240. The carriage 210 is moved at a constant speed from an end on the X2 side, which is an initial position in the second position 204 (see FIG. 2), to an end on the X1 side, on the other side thereof, in a sub-scanning direction X.

While the carriage 210 is moved in a constant speed, the luminous flux H2 from the original G, which is the luminous flux H1 emitted from the fluorescent lamp 240 being reflected by the original G, is condensed and reflected by the first reflective surface R1 of the first mirror 221, so as to be shorter in length in the main scanning direction Y (see FIG. 7) and to be the luminous flux H3 directed to the second mirror 222.

Similarly, the luminous fluxes H3, H4, and H5 are condensed and reflected by the second mirror 222, the third mirror 223, and the fourth mirror 224, respectively.

Here, as shown in FIG. 7, the first mirror 221, the second mirror 222, the third mirror 223, and the fourth mirror 224 are each formed so that a length in the main scanning direction Y is made shorter in accordance with a length in the main scanning direction Y of the luminous fluxes H2, H3, H4, and H5, as approaching the imaging lens 230 on the tight path H. The luminous fluxes H2, H3, H4, and H5 are each incident in a breadth (width) corresponding to a length between the vicinity of one end and the vicinity of another end in the main scanning direction Y of each of the first mirror 221, the second mirror 222, the third mirror 223, and the fourth mirror 224. In other words each of the first mirror 221, the second mirror 222, the third mirror 223, and the fourth mirror 224 is formed to correspond the length in the main scanning direction Y of each of the incident luminous fluxes H2, H3, H4 and H5, and to have a necessary and sufficient size for receiving, reflecting, and condensing each luminous flux.

The luminous flux H6 condensed by the first mirror 221, the second mirror 222, the third mirror 223, and the fourth mirror 224 is then incident upon the imaging lens.

The imaging lens 230, upon which the luminous flux H6 is incident, forms an image of the original G. The CCD 235 disposed in the imaging position reads the image of the original G as image data, on the basis of the image thus formed. The image data read by the CCD 235 is output to the CCD substrate 235. The image information being output to the CCD substrate 236 is then output to the circuit substrate 290 via the flexible print substrate 291.

Here, the circuit substrate 290 and the flexible print substrate 291 are disposed in the carriage 210, and thus the CCD 235 and the CCD substrate 235 are moved in an integrated manner.

Subsequently, the image information being output to the circuit substrate 290 is output to the device main body M from the image reading device 200.

The image information being input is input to an image forming control unit (not shown) in the device main body M. The image forming control unit controls the photoreceptor drum 2 as the image supporting body, the charging portion 10, the laser scanner unit 4, the developing unit 16 and the like constituting the image forming portion, on the basis of the image information. A predetermined toner image is formed on the photoreceptor drum 2 on the basis of the image information.

A similar image to the image of the original G is transferred to the paper T, which is conveyed to the transfer nip N formed by the photoreceptor drum 2 via the paper path L, on the basis of the image information. The paper T, on which the image is formed, is ejected from the erecting portion 50 to the ejected paper accumulating portion M1. Here, "similar image" includes an image of similar figure, an image having different coloration, a monochrome image and the like.

According to the present embodiment, a copy machine 1 can be provided in which a light path H is formed by reflecting luminous flux once on each of a plurality of mirrors in the mirror group 220, and predetermined mirrors are configured to be shorter in Length in a main scanning direction in accordance with a length of the luminous flux in the main scanning direction.

In addition, according to the present embodiment, material for mirrors constituting the mirror group 220 can be reduced, since the mirrors constituting the mirror group 220 are formed to be smaller in length in accordance with a length of a luminous flux in the main scanning direction Y. Therefore, a material cost for the copy machine 1 can be reduced.

In addition, according to the present embodiment, space can be saved in the internal space of the carriage 210, since the mirrors constituting the mirror group 220 are formed to be smaller in length in accordance with a length of a luminous flux in the main scanning direction Y. This can further improve packaging efficiency in the carriage 210.

Furthermore, according to the present embodiment, each of the mirrors constituting the mirror group 220 is formed to have the least length in the main scanning direction Y, thereby reducing mass of the entire mirror group 220. This can reduce the inertia force generated by loco of the carriage 210. In other words, a load applied to the motor portion 261 due to the loco of the carriage 210 can be reduced.

In addition, according to the present embodiment, the first mirror 221, the second mirror 222, the third mirror 223, and the fourth mirror 224 constituting the mirror group 220 are formed to be greater in thickness as approaching the imaging lens 230 on the light path H. In the present embodiment, the fourth mirror 224 is formed to be the greatest in thickness among the mirrors constituting the mirror group 220. Since a negative impact on the image due to curvature of the mirror and the like becomes strong the closer the CCD 235 is thereto, the negative impact on the image being read such as warping can be suppressed by adopting a configuration such as that of the present embodiment.

Furthermore, according to the present embodiment, the third mirror 223 as the intermediate mirror and the circuit substrate 290 are disposed in Juxtaposition in the main scanning direction Y. The circuit substrate 290 is disposed in the carriage 210 along with the CCD substrate 236 connected thereto via the flexible print substrate 291. The internal space of the housing case 205 can thus be efficiently used. In addition, the flexible print substrate 291 can thus be made smaller in length compared to a case where the circuit substrate 290 is disposed in the housing case 205. This can reduce a material cost for the flexible print substrate 291. Furthermore, by making the flexible print substrate 291 smaller in length, generation of noise (high-frequency waves and the like) by the flexible print substrate 291 can be inhibited.

A preferred embodiment of the present invention has been described above; however, the present invention is not limited thereto and can be carried out in various modes. For example, the copy machine 1 is exemplified in the present embodiment as an image forming device; however, the present invention is not limited thereto and can be a color copy machine, a printer, a facsimile machine, and a multi-functional printer having functions thereof.

In addition, the image reading device 200 is integratedly formed with the device main body M in the present embodiment; however, the present invention is not limited thereto and the image reading device can be configured with a housing other than the device main body M. For example, the image reading device 200 can be configured to be removable with respect to the device main body M.

Furthermore, the image reading device 200 constitutes a part of the copy machine 1 as the image forming device in the present embodiment; however, the present invention is not limited thereto, and the image reading device 230 can be a stand-alone device such as an image scanner.

In addition, according to the present embodiment the first mirror 21, the second mirror 222, the third mirror 223, and the fourth mirror 224 constituting the mirror group 220 are formed to be greater in thickness as approaching the imaging lens 230 on the light path H; however, the present invention is not limited thereto and the thickness of each mirror can be equal or gradually greater as approaching the imaging lens 230 on the light path H.

What is claimed is:

1. An image reading device comprising: a light source portion that irradiates light onto an original;
    a mirror group comprising a plurality of mirrors that forms a light path by reflecting luminous flux from the original once on each of the plurality of mirrors, and is configured so that an imaging-side mirror, which is disposed most to an imaging side on the light path, has a shortest length in a main scanning direction;
    an imaging lens that forms an image from luminous flux reflected by the mirror group;
    a reading portion that reads an image on the original based on image formation by the imaging lens, disposed in an imaging position of the imaging lens; and
    a casing body that houses the light source portion, the mirror group, the imaging lens, and the reading portion, to be movable in a sub-scanning direction that is orthogonal to the main scanning direction;
    wherein a thickness of the imaging-side mirror is formed so as to be greater than a thickness of an original-side mirror, included in the mirror group, which is disposed most to a side of the original on the light path.

2. The image reading device according to claim 1, wherein the plurality of mirrors constituting the mirror group are respectively made to be sequentially shorter in length in the main scanning direction as approaching a side of the imaging lens from a side of the original on the light path.

3. The image reading device according to claim 1, wherein a thickness of each of the plurality of mirrors constituting the mirror group is made to be equal or become gradually greater in thickness as approaching a side of the imaging lens from a side of the original on the light path.

4. The image reading device according to claim 1, wherein:
    a circuit substrate on which a control unit for controlling behavior of the reading portion is mounted, and a signal wire for electrically connecting the reading portion and the circuit substrate are disposed in the casing body;
    the mirror group comprises the imaging-side mirror, an original-side mirror disposed most to a side of the original on the light path, and at least one intermediate mirror disposed between the original-side mirror and the imaging side mirror; and
    the circuit substrate is disposed alongside a predetermined intermediate mirror included among the at least one intermediate mirror in the main scanning direction.

5. The image reading device according to claim 4, wherein: the plurality of mirrors is comprises: a first mirror that is the original-side mirror; a second mirror that is the intermediate mirror, a third mirror that is the intermediate mirror, and a fourth mirror that is the imaging-side mirror, which are sequentially disposed from the side of the original toward the side of the imaging lens, in a direction of the light path;
    the first mirror is disposed on a bottom face side of the casing body;
    the second mirror is disposed on a first side in the sub-scanning direction of the casing body;
    the third mirror is disposed on a second side in the sub-scanning direction of the casing body;
    the fourth mirror is disposed on the first side in the sub-scanning direction of the casing body, more to the bottom face side than the first mirror; and
    the circuit substrate is disposed alongside the third mirror in the main scanning direction.

6. An image forming device comprising: an image reading device including a light source portion that irradiates light onto an original,
    a mirror group comprising a plurality of mirrors that forms a light path by reflecting luminous flux from the original once on each of the plurality of mirrors, and is configured so that an imaging-side mirror, which is disposed most to an imaging side on the light path, has a shortest length in a main scanning direction,
    an imaging lens that forms an image from luminous flux reflected by the mirror group,
    a reading portion that reads an image on the original based on image formation by the imaging lens, disposed in an imaging position of the imaging lens, and
    a casing body that houses the light source portion, the mirror group, the imaging lens, and the reading portion, to be movable in a sub-scanning direction that is orthogonal to the main scanning direction;
    an image supporting body on a surface of which an electrostatic latent image is created based on image information relating to an image of the original that is read by the image reading device;
    a developing unit that develops a toner image on the electrostatic latent image created on the image supporting body;

and a transfer portion that directly or indirectly transfers the toner image formed on the image supporting body to a predetermined paper;

wherein a thickness of the imaging-side mirror is formed so as to be greater than a thickness of an original-side mirror, included in the mirror group, which is disposed most to a side of the original on the light path.

7. The image forming device according to claim 6, wherein the plurality of mirrors constituting the mirror group are respectively made to be sequentially shorter in length in the main scanning direction as approaching a side of the imaging lens from a side of the original on the light path.

8. The image forming device according to claim 6, wherein a thickness of each of the plurality of mirrors constituting the mirror group is made to be equal or become gradually greater in thickness as approaching a side of the imaging lens from a side of the original on the light path.

9. The image forming device according to claim 6, wherein: a circuit substrate on which a control unit for controlling behavior of the reading portion is mounted, and a signal wire for electrically connecting the reading portion and the circuit substrate are disposed in the casing body;

the mirror group comprises the imaging-side mirror, an original-side mirror disposed most to a side of the original on the light path, and at least one intermediate mirror disposed between the original-side mirror and the imaging side mirror; and the circuit substrate is disposed alongside a predetermined intermediate mirror included among the at least one intermediate mirror in the main scanning direction.

10. The image forming device according to claim 9, wherein: the plurality of mirrors comprises: a first mirror that is the original-side mirror; a second mirror that is the intermediate mirror, a third mirror that is the intermediate mirror, and a fourth mirror that is the imaging-side mirror, which are sequentially disposed from the side of the original toward the side of the imaging lens, in a direction of the light path;

the first mirror is disposed on a bottom face side of the casing body;

the second mirror is disposed on a first side in the sub-scanning direction of the casing body;

the third mirror is disposed on a second side in the sub-scanning direction of the casing body;

the fourth mirror is disposed on the first side in the sub-scanning direction of the casing body, more to the bottom face side than the first mirror; and the circuit substrate is disposed alongside the third mirror in the main scanning direction.

* * * * *